(12) United States Patent
Mermoud et al.

(10) Patent No.: US 10,965,562 B2
(45) Date of Patent: Mar. 30, 2021

(54) DYNAMICALLY ADJUSTING PREDICTION RANGES IN A NETWORK ASSURANCE SYSTEM

(71) Applicant: Cisco Technology, Inc., San Jose, CA (US)

(72) Inventors: Grégory Mermoud, Veyras (CH); Jean-Philippe Vasseur, Saint Martin D'uriage (FR); Erwan Barry Tarik Zerhouni, Zürich (CH)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 15/972,306

(22) Filed: May 7, 2018

(65) Prior Publication Data

US 2019/0342195 A1 Nov. 7, 2019

(51) Int. Cl.
*H04L 12/26* (2006.01)
*H04L 29/06* (2006.01)
(Continued)

(52) U.S. Cl.
CPC ........... *H04L 43/062* (2013.01); *G06F 40/20* (2020.01); *G06N 20/00* (2019.01); *H04L 43/08* (2013.01); *H04L 63/1425* (2013.01); *H04L 67/10* (2013.01)

(58) Field of Classification Search
CPC .. G06F 17/27; G06F 16/244; G06F 16/24578; G06F 17/2785; G06F 17/28;
(Continued)

(56) References Cited

U.S. PATENT DOCUMENTS 7,526,467 B2 4/2009 Fogel
8,544,087 B1* 9/2013 Eskin .................... G06F 21/552
726/22
(Continued)

OTHER PUBLICATIONS

Siffer et al., "Anomaly Detection in Streams with Extreme Value Theory", KDD 2017—Proceedings of the 23rd ACM SIGKDD International Conference on Knowledge Discovery and Data Mining, Aug. 2017. Retrieved online on Nov. 4, 2020 from https://hal.archives-ouvertes.fr/hal-01640325/document (Year: 2017).*

(Continued)

*Primary Examiner* — Dhairya A Patel
*Assistant Examiner* — Sandarva Khanal
(74) *Attorney, Agent, or Firm* — Behmke Innovation Group LLC; Kenneth J. Heywood; Jonathon P. Western (57) ABSTRACT

In one embodiment, a network assurance service that monitors a network detects anomalies in the network by applying one or more machine learning-based anomaly detectors to telemetry data from the network. The network assurance service receives ranking feedback from a plurality of anomaly rankers regarding relevancy of the detected anomalies. The network assurance service calculates a rescaling factor and quantile parameter by applying an objective function to the ranking feedback, in order to optimize the rescaling factor and quantile parameter of the one or more anomaly detectors. The network assurance service adjusts the rescaling factor and quantile parameter of the one or more anomaly detectors using the calculated rescaling factor and quantile parameter.

16 Claims, 8 Drawing Sheets

(51) Int. Cl.
*G06N 20/00* (2019.01)
*G06F 40/20* (2020.01)
*H04L 29/08* (2006.01)

(58) Field of Classification Search
CPC ...... G06F 40/20; G06N 20/00; G06N 3/0445;
G06N 3/08; G06N 3/084; G06N 5/025;
H04L 63/1425; H04L 41/12; H04L
41/145; H04L 41/147; H04L 43/022;
H04L 43/062; H04L 43/08; H04L
63/1416; H04L 63/1433; H04L 63/1458;
H04L 67/02; H04L 67/10; H04L 67/42
See application file for complete search history.

(56) References Cited

U.S. PATENT DOCUMENTS

| | | | |
|---|---|---|---|
| 9,336,268 B1 | 5/2016 | Moudy et al. | |
| 10,459,827 B1* | 10/2019 | Aghdaie | G06F 11/0766 |
| 2009/0132696 A1* | 5/2009 | Cankaya | H04L 61/2015 |
| | | | 709/224 |
| 2010/0042561 A1* | 2/2010 | Abe | G06N 20/00 |
| | | | 706/12 |
| 2011/0078301 A1* | 3/2011 | Dehaan | H04L 43/16 |
| | | | 709/224 |
| 2015/0112883 A1* | 4/2015 | Orduna | G06Q 50/265 |
| | | | 705/325 |
| 2016/0219066 A1* | 7/2016 | Vasseur | H04L 63/1425 |
| 2017/0063890 A1* | 3/2017 | Muddu | G06F 3/04847 |
| 2017/0279830 A1 | 9/2017 | Mermoud et al. | |
| 2018/0139086 A1* | 5/2018 | Chakraborty | H04L 49/252 |
| 2019/0081969 A1* | 3/2019 | Phadke | H04L 63/1425 |
| 2019/0190938 A1* | 6/2019 | Oba | G06N 20/20 |
| 2019/0205950 A1* | 7/2019 | Balasubramanian | |
| | | | H04L 67/306 |
| 2019/0228296 A1* | 7/2019 | Gefen | G06N 3/0445 |
| 2019/0340659 A1* | 11/2019 | Chapman | G06Q 30/0282 |

OTHER PUBLICATIONS

Liu, et al., "Anomaly Detection in Feedback-based Reputation Systems through Temporal and Correlation Analysis", 2010 IEEE Second International Conference on Social Computing (SocialCom), 8 pages, 2010, IEEE.

Wang, et al., "Reputation Measurement and Malicious Feedback Rating Prevention in Web Service Recommendation Systems", IEEE Transactions on Services Computing, vol. 8, No. 5, Sep./Oct. 2015, pp. 755-767, 2015, IEEE.

* cited by examiner

DYNAMICALLY ADJUSTING PREDICTION RANGES IN A NETWORK ASSURANCE SYSTEM

TECHNICAL FIELD

The present disclosure relates generally to computer networks, and, more particularly, to dynamically adjusting prediction ranges in a network assurance system.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a network assurance service that monitors a network detects anomalies in the network by applying one or more machine learning-based anomaly detectors to telemetry data from the network. The network assurance service receives ranking feedback from a plurality of anomaly rankers regarding relevancy of the detected anomalies. The network assurance service calculates a rescaling factor and quantile parameter by applying an objective function to the ranking feedback, in order to optimize the rescaling factor and quantile parameter of the one or more anomaly detectors. The network assurance service adjusts the rescaling factor and quantile parameter of the one or more anomaly detectors using the calculated rescaling factor and quantile parameter.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
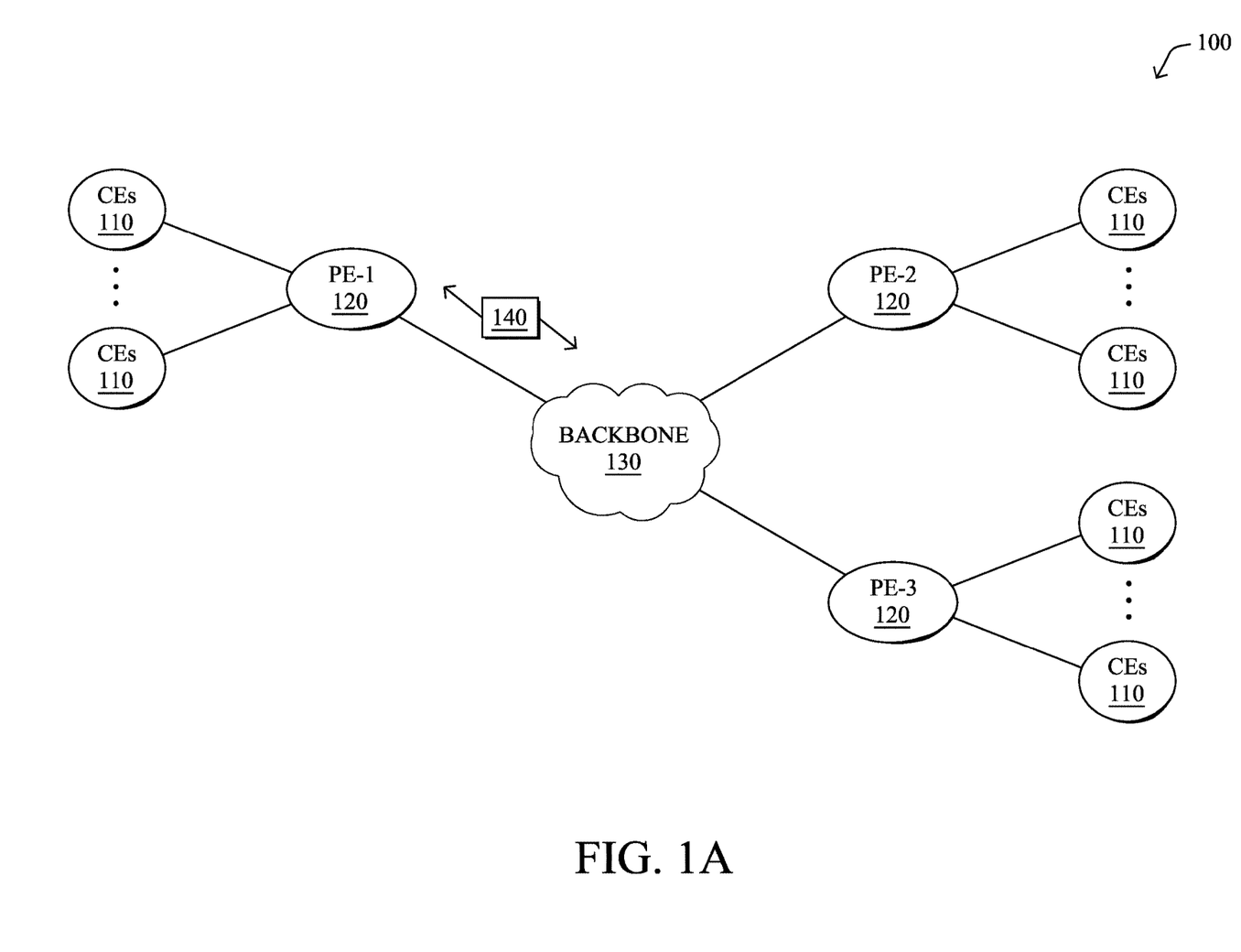
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
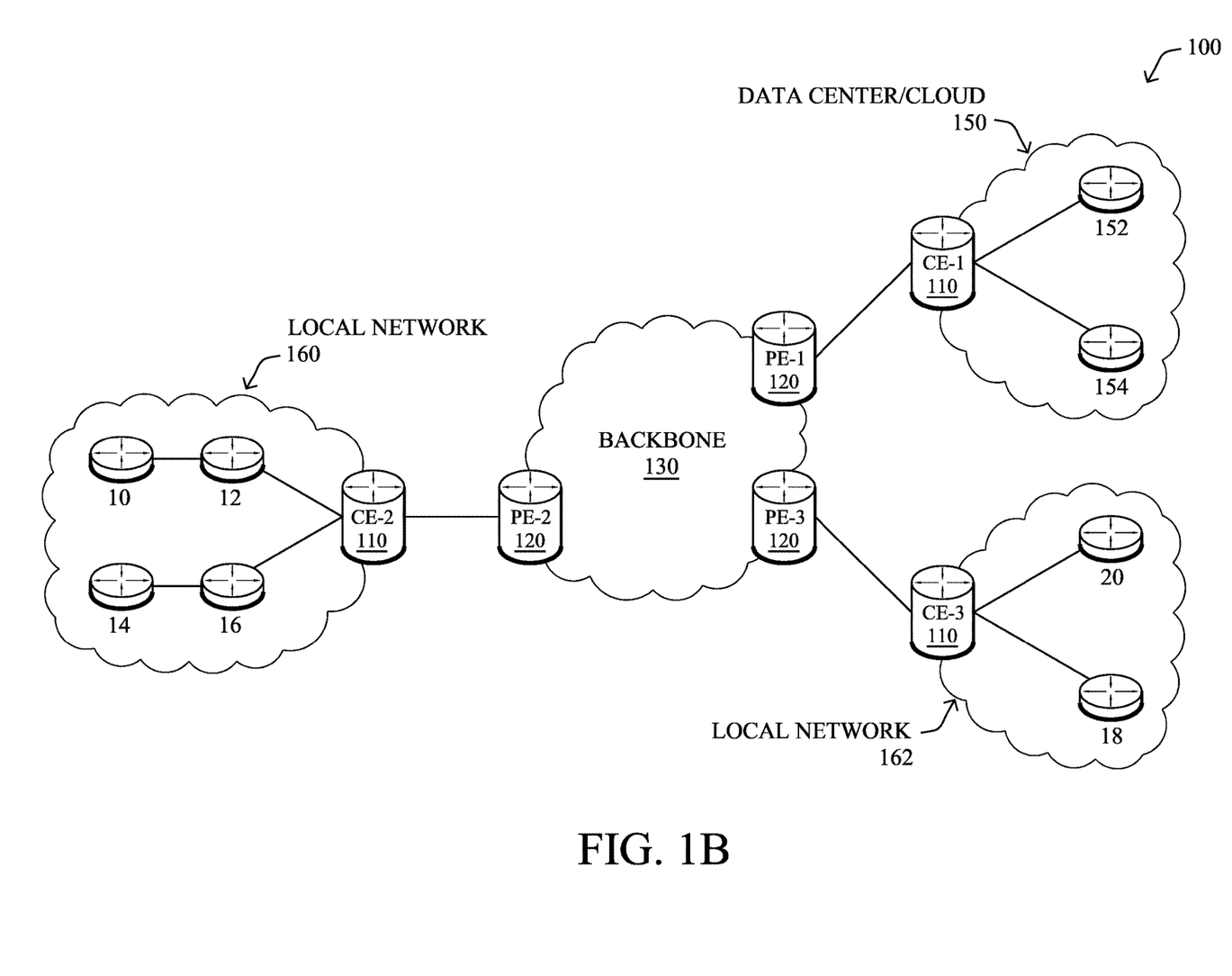

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
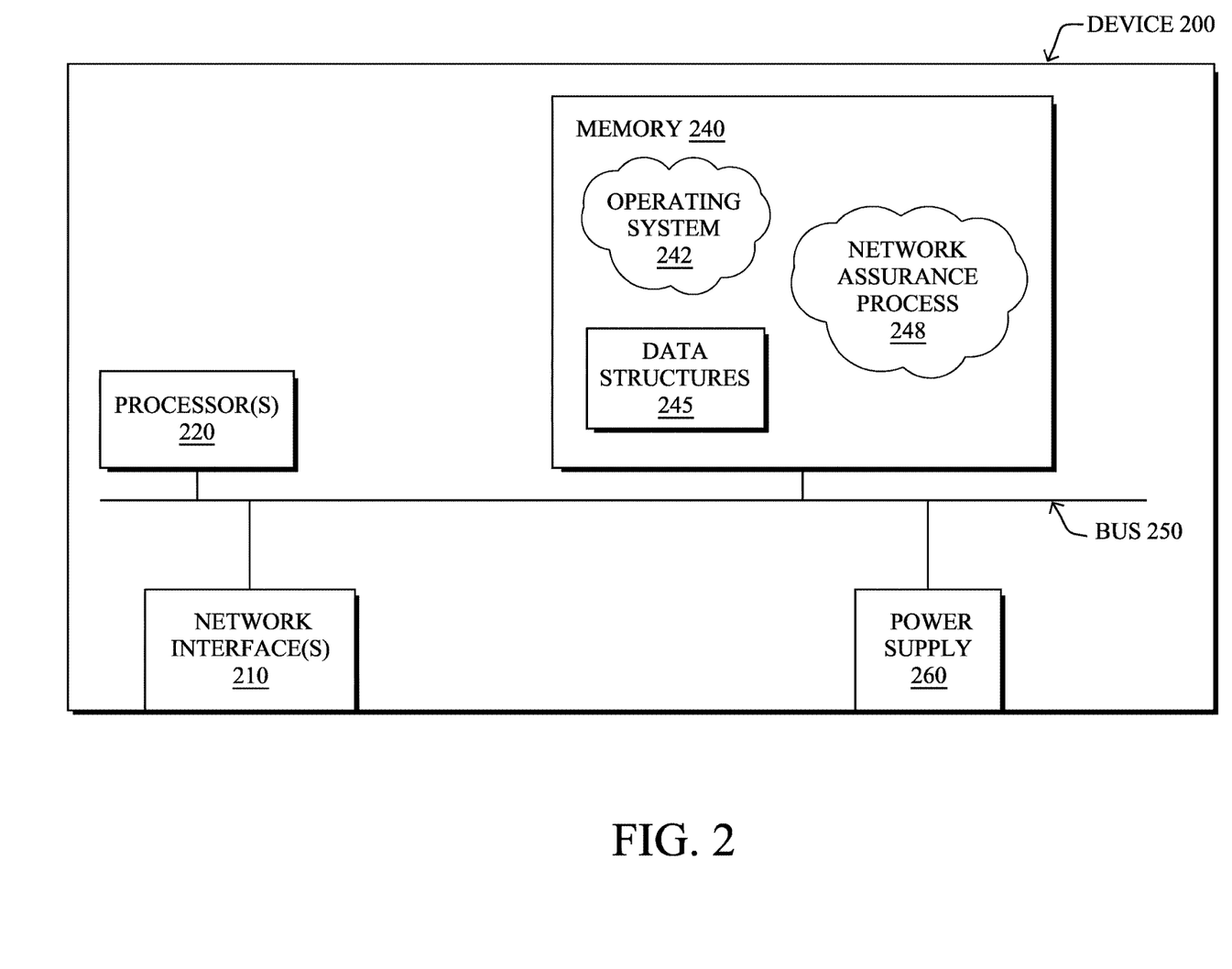
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
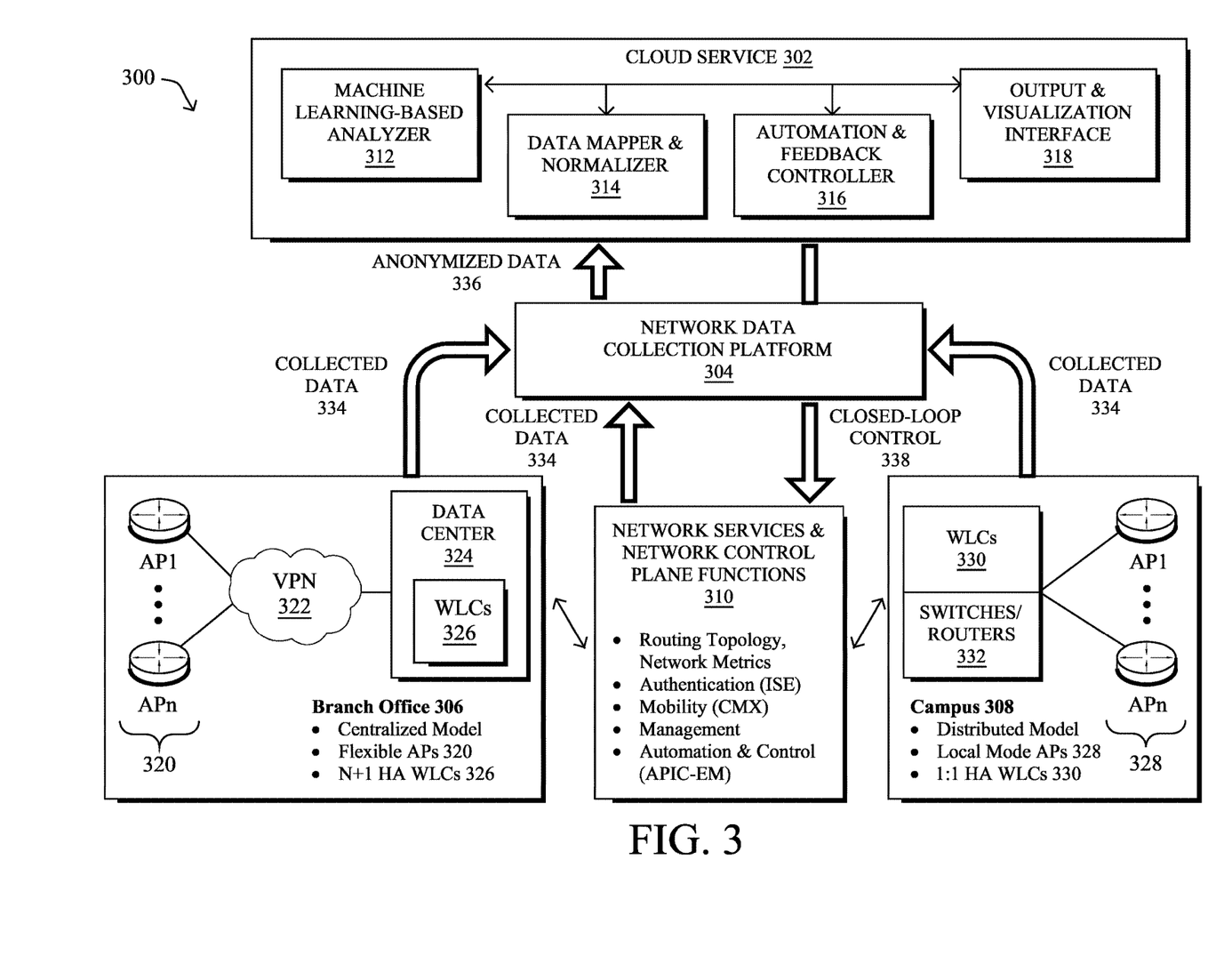
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, a network assurance service may leverage machine learning to detect anomalies in the monitored network. Such learning can include a combination of unsupervised learning (e.g., for anomaly detection), supervised learning (e.g., by computing labels for strong outliers), and/or active learning. One challenge to this approach, however, is only raising anomaly alerts that are relevant to a network administrator or other user. Indeed, the issue of false positives presents a significant hurdle to the adoption of machine learning-based assurance services.

If the anomaly detection functions of a network assurance service are too sensitive, this may lead to an unacceptable false positive rate. Conversely, if the anomaly detection functions are too conservative, this can lead to false negatives (e.g., actual networking issues that are not reported). This is further exacerbated because a false positive from the standpoint of a user (e.g., a reported anomaly that is deemed irrelevant) may still be a true positive from a machine learning standpoint. In other words, even though the anomaly is a true outlier from a statistical standpoint, the user may not view the anomaly as an issue. In addition, feedback from an anomaly ranker is often highly subjective and it has been shown through testing that relevancy must be learned dynamically as a function of the use case/anomaly type, as well as the specific anomaly ranker that provides the feedback.

Dynamic Adjusting Prediction Ranges in a Network Assurance System

The techniques herein introduce a number of components for a network assurance system that work in conjunction with one another to filter and extract information from anomaly feedback provided by a set of anomaly rankers. Such feedback may comprise ranks on a grading scale (e.g., '1' for a relevant anomaly and '−1' for an anomaly that is not relevant) and/or text-based reasons for the ranks provided by the anomaly rankers. In turn, the extracted information from the feedback can be used to adjust parameters of the anomaly detector(s), such as the rescaling factor and/or quantile parameter, to ensure that only the most relevant anomalies are reported by the network assurance system.

Specifically, according to one or more embodiments of the disclosure as described in detail below, a network assurance service that monitors a network detects anomalies in the network by applying one or more machine learning-based anomaly detectors to telemetry data from the network. The network assurance service receives ranking feedback from a plurality of anomaly rankers regarding relevancy of the detected anomalies. The network assurance service calculates a rescaling factor and quantile parameter by applying an objective function to the ranking feedback, in order to optimize the rescaling factor and quantile parameter of the one or more anomaly detectors. The network assurance service adjusts the rescaling factor and quantile parameter of the one or more anomaly detectors using the calculated rescaling factor and quantile parameter.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
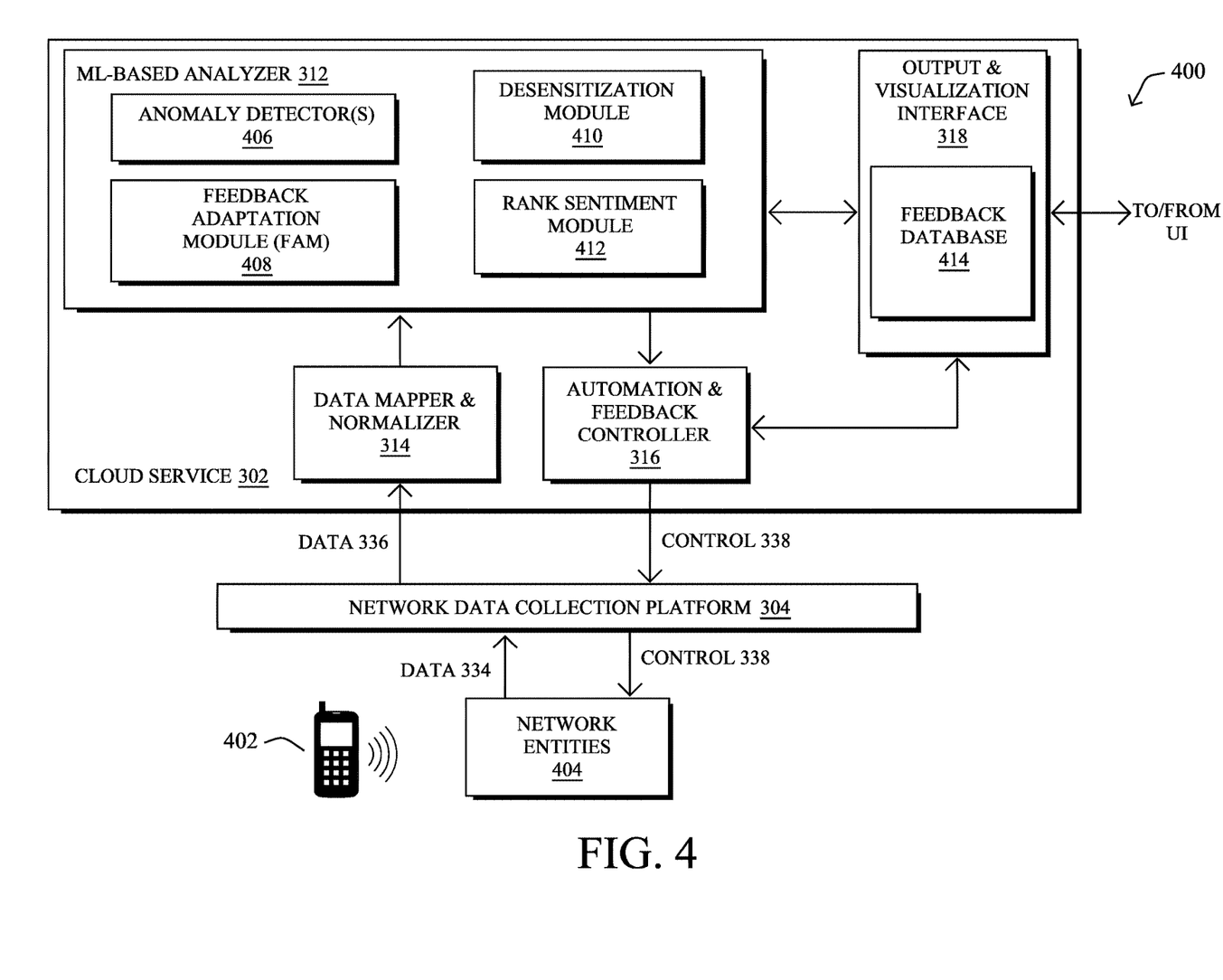
FIG. 4 illustrates an example architecture for dynamically adjusting prediction ranges in a network assurance system.

Operationally, FIG. 4 illustrates an example architecture for dynamically adjusting prediction ranges in a network assurance system, according to various embodiments. At the core of architecture 400 may be the following components: one or more anomaly detectors 406, a feedback adaptation module (FAM) 408, a desensitization module 410, a ranker sentiment module 412, and/or a feedback database 414. In some implementations, the components of architecture 400 may be implemented within a network assurance system, such as system 300 shown in FIG. 3. Accordingly, the components 406-414 of architecture 400 shown may be implemented as part of cloud service 302 (e.g., as part of machine learning-based analyzer 312 and/or output and visualization interface 318), as part of network data collection platform 304, and/or on one or more network elements/entities 404 that communicate with one or more client devices 402 within the monitored network itself. Further, these components may be implemented in a distributed manner or implemented as its own stand-alone service, either as part of the local network under observation or as a remote service. In addition, the functionalities of the components of architecture 400 may be combined, omitted, or implemented as part of other processes, as desired.

During operation, service 302 may receive telemetry data from the monitored network (e.g., anonymized data 336 and/or data 334) and, in turn, assess the data using one or more anomaly detectors 406. At the core of each anomaly detector 406 may be a corresponding anomaly detection model, such as an unsupervised learning-based model. When an anomaly detector 406 detects a network anomaly, output and visualization interface 318 may send an anomaly detection alert to a user interface (UI) for feedback from any number of anomaly rankers.

From a computational standpoint, a network "issue" may be represented as a collection of events, where an "event" refers to an anomalous data point identified by an anomaly detector 406. For example, if the target metric is wireless throughput in the monitored network, the anomalous event relates to a throughput measurement which falls outside of the predicted range of throughput values, according to the predictive model of an anomaly detector 406. Notably, one approach that an anomaly detector 406 can take to detect throughput anomalies may entail computing the predictive range using a lower/upper band for the predicted throughput that are calculated using a regression model, such as Gradient Boosting Trees that take into account a variety of features/measurements from the network. Then, the predicted range is extended by applying a multiplication factor to either the lower band, the upper bound, or to both bands. Such parameters (e.g., percentile values, rescaling factors, etc.) typically vary with the use cases and network characteristics, as well as the user profile. This last factor can strongly influence the level of relevancy of the anomalies. As would be appreciated, the techniques introduced herein allow for the predictive range(s) of anomaly detector(s) 406 to be dynamically recomputed/adjusted by taking into account the anomaly feedback provided by the anomaly rankers.

As shown, network assurance service 302 may include an output and visualization interface 318 that communicates with a user interface (UI), or a plurality thereof, to allow anomaly rankers to provide feedback about the issues raised by the system. For example, output and visualization interface 318 may provide a dashboard or other interface that displays information regarding anomalies detected by anomaly detector(s) 406. Service 302 may collect this feedback in a database referred to as a feedback database 414. For illustrative purposes, assume that each feedback relates to a given issue I raised by an anomaly detector model A of anomaly detector 406, parameterized by a set of N parameters $P_1, P_2, \ldots, P_N$. Example of such parameters may include the upper/lower percentile, rescaling factor, time window, or the like, of the anomaly detector that raised the issue for which the feedback was provided.

In various embodiments, architecture 400 may include feedback adaptation module (FAM) 408, which is responsible for processing individual feedback from users and experts acting as anomaly rankers, and adjust the parameters $P_i$ of anomaly detector(s) based on the feedback. FAM 408 may operate in batch mode or online mode, in various embodiments. In batch mode, FAM 408 may run every X hours, collecting all feedbacks in feedback database 414, and optimizing the parameters $P_i$ of anomaly detector(s) 406 such that as many negatively rated anomalies are suppressed and as many positively rated anomalies are raised. To do so, FAM 408 may use a grid search in the parameter space, if N is small, or it may rely on meta-heuristics such as Genetic Algorithms, Simulated Annealing, or Particle Swarm Optimization, to search the optimal parameter set in case N grows large, in various embodiments.

By way of example, assume that K-number of anomaly rankers have provided feedback on L-number of issues. In some embodiments, FAM 408 may first filter out any feedback from bad or unreliable rankers, such as those whose feedback statistically differs from that of other rankers by a certain amount. In some embodiments, FAM 408 may seek to reduce the number of false positives of anomaly detector(s) 406 (e.g., negative expert feedback, indicating that a reported anomaly is irrelevant), while maximizing the true positives of anomaly detector(s) 406 (e.g., positive feedback, indicating that a reported anomaly is relevant).

According to various embodiments, FAM 408 may optimize the parameters of anomaly detector(s) 406 by grouping the parameters into a "particle." Each particle (e.g., group of parameters) can then be assumed to have a position, velocity, and an objective value. Generally, the position of a particle corresponds to the value of its parameters. The velocity of the particle is defined as the direction and distance to reach, similar to a gradient descent. Finally, the objective value of the particle is determined by an objective function, which can be seen as an optimization function. At every step, each particle "moves" towards the direction of the best solution in the solution space. Each particle keeps track of its personal best solution, while the whole optimization strategy keeps track of the global best solution.

By way of example, assume that FAM 408 is to optimize two parameters of anomaly detector(s) 406: the rescaling factor and the quantile parameter of the underlying anomaly detection model. In such a case, these parameters may be set initially to their default values. In turn, FAM 408 may seek to find the best values for these parameters, subject to the objective function. For example, FAM 408 may find the "best" solution for a particle by attempting to minimize the following objective function:

$$\text{argmin}_{q,r} = -\sum_{i=0}^{K \cdot L} \alpha_i \cdot y_i \cdot \hat{y}_i \quad \text{(Equation 1)}$$

where q is the quantile factor and r is the rescaling factor. Here, $\alpha_i$ may take on the value '$\alpha$' if the corresponding feedback is positive and the value '$\beta$' if the feedback is negative. Similarly, $y_i$ may take on the value of '1' if the feedback is positive and '−1' if the feedback is negative. Finally, $\hat{y}_i$ may take on the value of '1' if the feedback is positive and '−1' if the feedback is negative.

FAM 408 may repeat the following until the best solution according to Equation 1 no longer changes. More specifically, FAM 408 may update the quantile and rescaling factors using the velocity equation (Equation 2) and position equation (Equation 3) below:

$$V_{X,i}^{t+1} = w \cdot V_{X,i}^{t} + c_1 \cdot (L_i^{best} - V_{X,i}^{t}) + c_2 \cdot \text{rand} \cdot (G^{Lbest} - V_{X,i}^{t}) \quad \text{(Equation 2)}$$

$$X_i^{t+1} = X_i^{t} + V_{X,i}^{t+1} \quad \text{(Equation 3)}$$

where X is either the quantile parameter (q) or the rescaling factor (r), G is the best global values (e.g., according to the objective function in Equation 1) i corresponds to the $i^{th}$ particle, and W, $c_1$, and $c_2$ are fixed values, rand is a random value drawn from a uniform distribution between 0 and 1. For each particle, FAM 408 calculates its new objective value. If the new objective value is better than its personal best, FAM 408 may update the personal best objective value. This process completes when FAM 408 determines that the global best objective values converges or that a maximum number of iteration is reached. Such a maximum number of iterations may be preset or based on the amount of feedback available from the anomaly rankers (e.g., when FAM 408 has exhausted the associated feedback in feedback database 414).

In online mode, FAM 408 may use every feedback available in feedback database 414 to adapt the parameters of anomaly detector(s) 406. That is, some of the parameters $P_i$ will be increased or decreased by FAM 408 upon receiving positive or negative feedback. For instance, FAM 408 may slightly increase the rescaling factor of an anomaly detector 406 in response to service 302 receiving negative feedback regarding a reported anomaly (e.g., because the user considers that the anomaly isn't relevant, hence the anomaly detector must increase its tolerance). To that end, FAM 408 may analyze whether there is a strict correlation between the density of negative feedback (or the ratio between positive and negative feedback) and the distance to the bound (e.g., whether there are more false positive data points as the predicted band is approached). Conversely, positive feedback will lead to a slight decrease of the rescaling factor of anomaly detector 406 by FAM 408. For instance, FAM 408 could use a grid search on the rescaling factor (denoted r) to minimize the following:

$$\text{argmin}_r = -\sum_{i=0}^{L} \alpha_i \cdot y_i \cdot y_i' + \lambda \cdot (r - r_{current})^2 \quad \text{(Equation 4)}$$

where $y_i$ is ground truth coming from the ranker feedback, $y_i'$ is the prediction of the system, and $r_{current}$ is the current rescaling factor in use by anomaly detector 406. Hence the grid search employed by FAM 408 will try to find the best rescaling factor that minimize the number of false positives, maximize the number of true positives, but also is close to current rescaling factor, to avoid the rescaling factor moving too far away from its initialized value coming from the batch mode. Moreover, it is important to note that the grid search would be performed on a per monitored network basis. Hence, while the batch mode can be seen has merging information from multiple networks undergoing monitoring, the online mode can be seen as a way to tailor the optimization to the specificity of a particular network and set of anomaly rankers (e.g., rankers associated with monitored network A may differ in opinion from those associated with monitored network B).

In various embodiments, architecture 400 may also include desensitization module 410 that is configured to reset the entire optimization performed by FAM 408. For example, desensitization module 410 may do so in response to receiving a desensitization request via the UI and/or at a predefined time, such as periodically. This is particularly of value for on-premises deployments of architecture 400 (e.g., some or all of service 302 may be located in the monitored network itself), whereby a few rankers providing incorrect feedback (e.g., due to insufficient training, lack of expertise, etc.) may lead to important biases. In such situations, the desensitization performed by desensitization module 410 may consist in a partial reset only, or the temporary enablement of a more explorative behavior (e.g., by introducing some noise in the parametrization in order to collect more diverse feedback).

In further embodiments, architecture 400 may include ranker sentiment module 412 that is configured to model ranker sentiments across time, to better perceive the needs of the rankers. In some embodiments, the rankers may also provide textual expressions that explain the reason(s) for the feedback rank supplied by the ranker. For example, a given ranker may indicate that a reported anomaly is not particularly relevant and supply a text-based comment to explain why.

By way of example, assume that there are N-number of texts from a particular ranker spread over a certain time period. For each text, ranker sentiment module 412 may extract out the opinion of the ranker regarding the raised issue from its corresponding explanation using a bidirectional long short-term memory (LSTM), natural language processing (NLP) technique, or the like. Hence, after extracting the general sentiment from each text, ranker sentiment module 412 can build a user sentiment time series and assess how the sentiment of the anomaly ranker(s) changes over time. For instance, if the sentiment of the ranker(s) is consistently degrading over time, the anomaly detection algorithm of anomaly detector(s) 406 will be more strongly regularized.

Figure 5A:
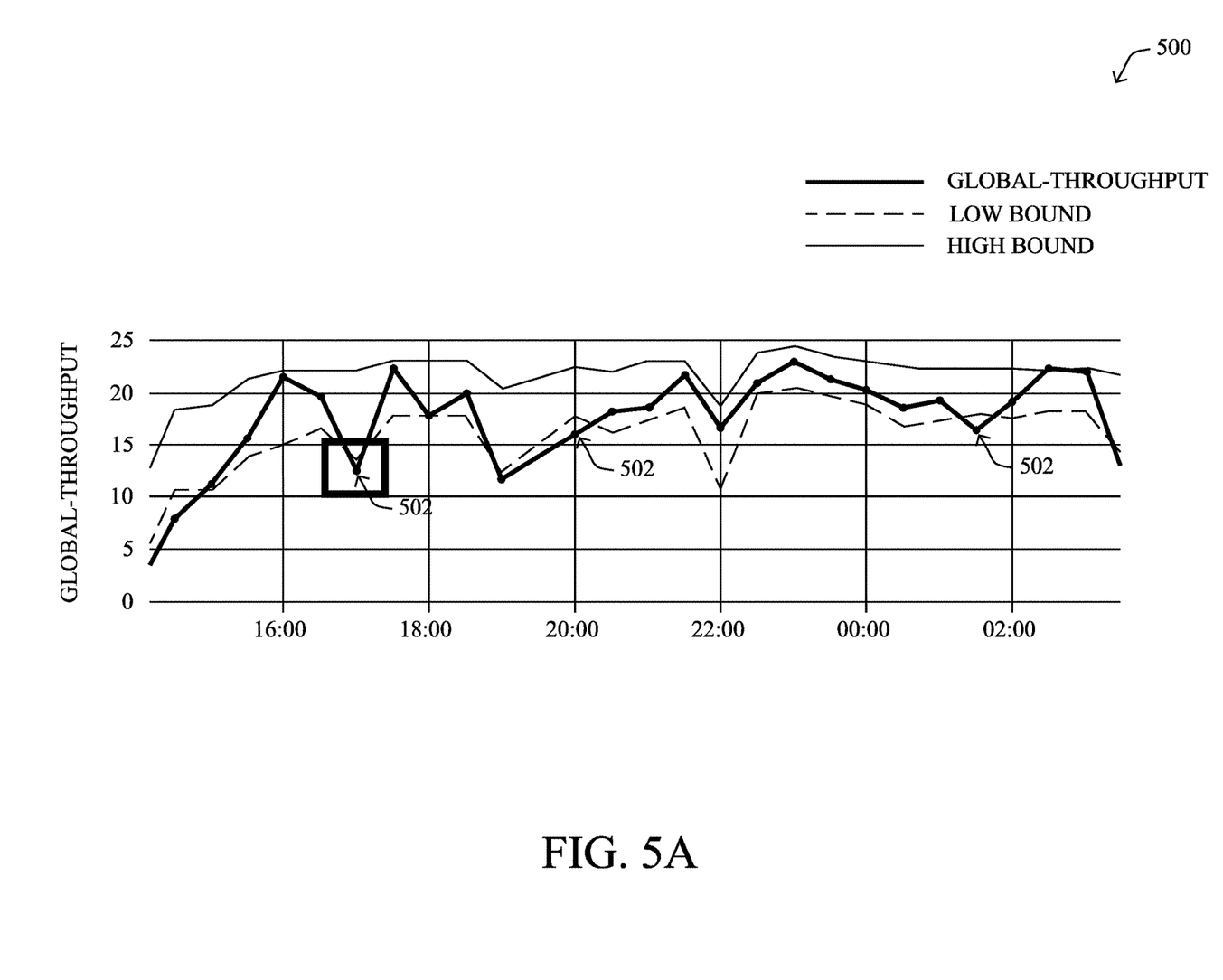
FIGS. 5A-5B illustrate example plots of anomaly detection prediction bands over time.
Figure 5B:
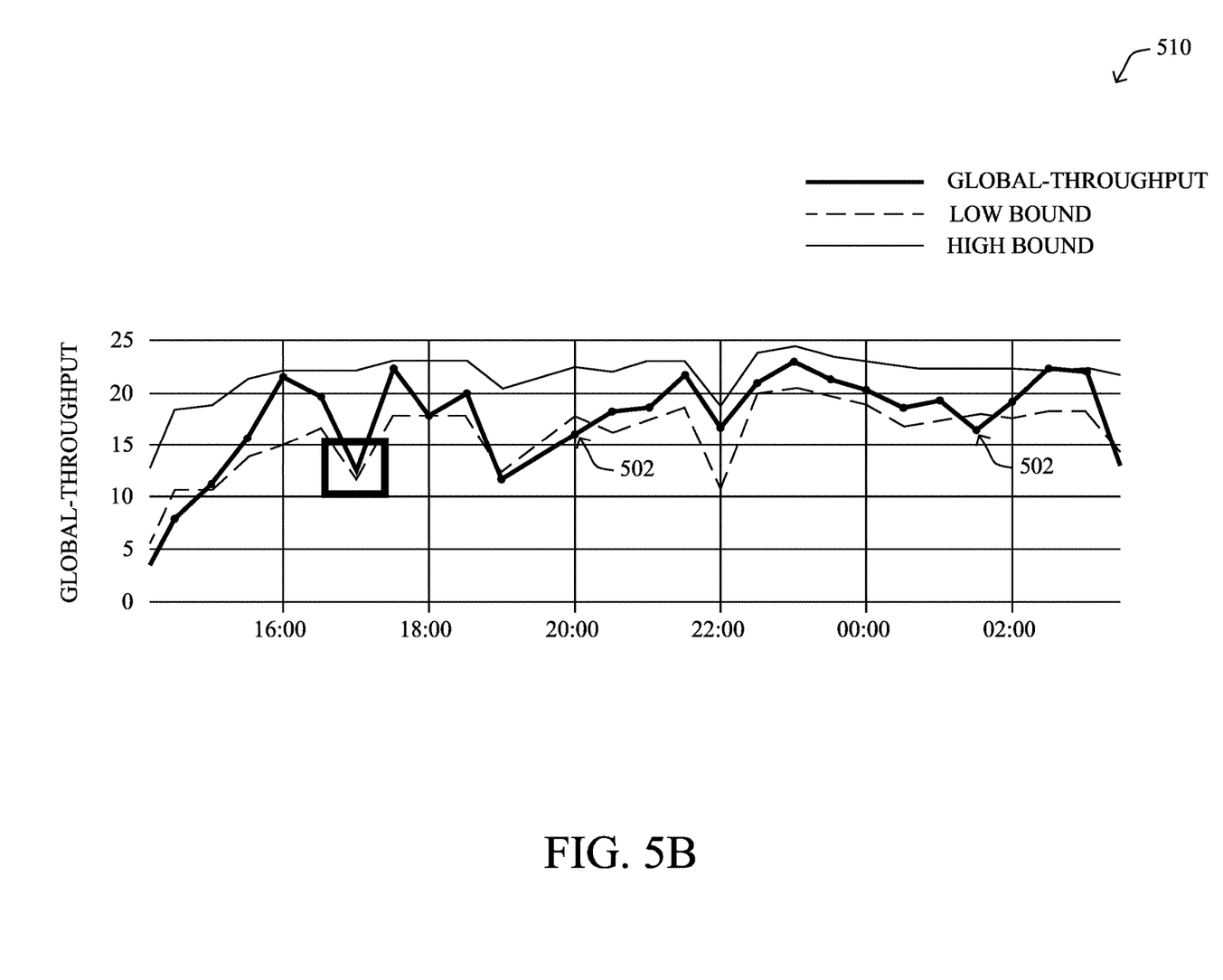

To illustrate the functions of architecture 400, FIGS. 5A-5B illustrate example plots of anomaly detection prediction bands over time. In particular, plot 500 in FIG. 5A illustrates the predictions of a low throughput anomaly detector over time, but without feedback from anomaly rankers. As can be seen, multiple anomalies 502 are raised by the anomaly detector because the monitored networking device exhibited anomalous throughput behaviors. Notably, one such anomaly 502 was raised at 5:00 PM (17:00).

FIG. 5B illustrates a plot 510 in which the machine learning system utilizes the parameter adjustment techniques disclosed herein. In such a case, the anomaly rankers may provide feedback for certain anomalies which were not relevant to the user perceptive. Hence, the rankers will grade these anomalies poorly and potentially explain why they believe these anomalies are not relevant via a text-based explanation. Using the techniques herein, the system will automatically adapt the parameters of the anomaly detector. Thus, if the same situation as in FIG. 5A occurs, the system will respond in the manner illustrated in plot 510 in FIG. 4B. As one can see, only the anomaly 502 at 5:00 PM is affected by the rescaling because it has some common characteristics found across multiple ranker feedback. In other words, the parameters of the anomaly detector may be adjusted such that the anomaly at 5:00 PM is not raised by the system as an anomaly.

Figure 6:
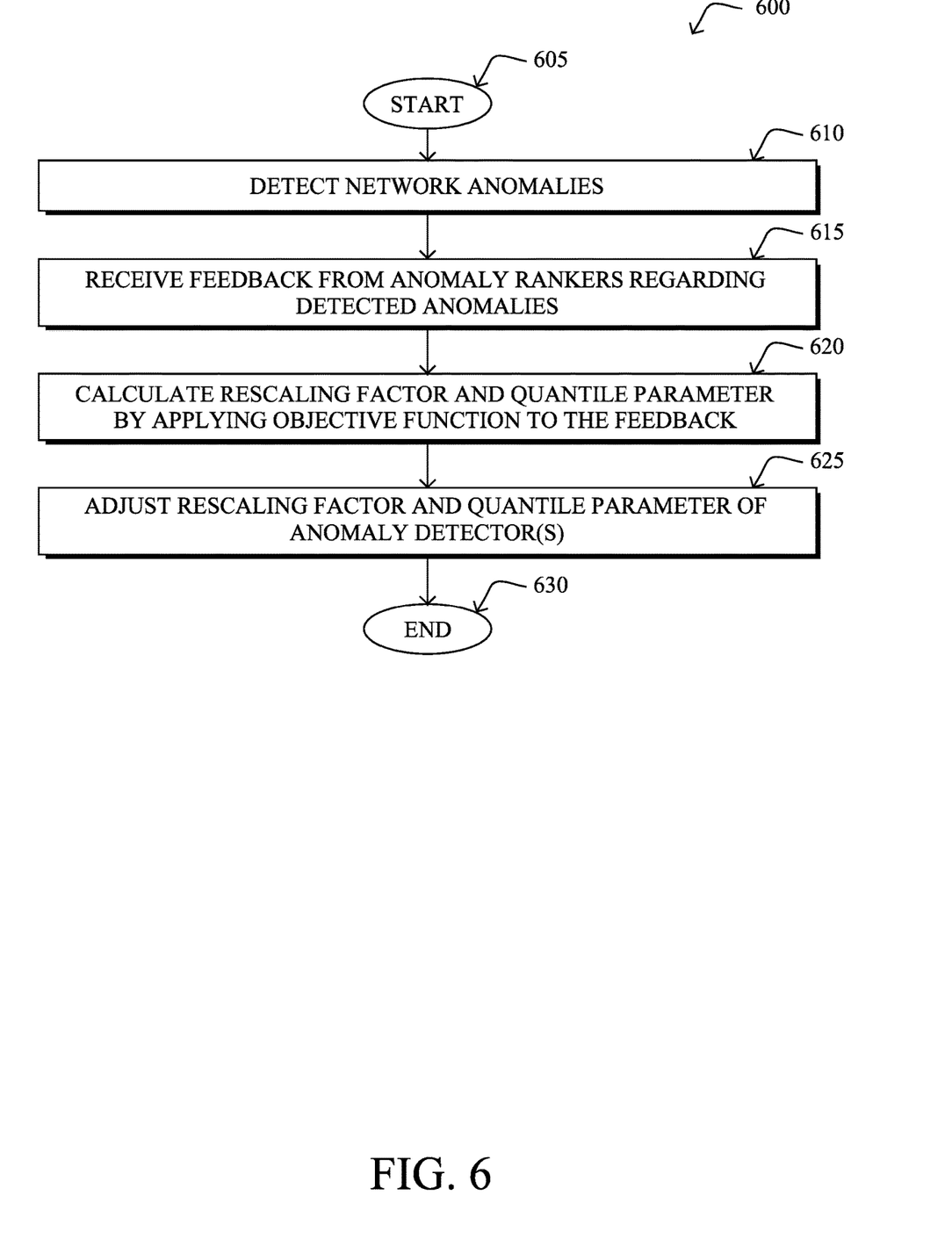
FIG. 6 illustrates an example simplified procedure for dynamically adjusting prediction ranges in a network assurance system.

FIG. 6 illustrates an example simplified procedure for dynamically adjusting prediction ranges in a network assurance system, in accordance with one or more embodiments described herein. For example, a non-generic, specifically configured device (e.g., device 200) may perform procedure 600 by executing stored instructions (e.g., process 248) to implement a network assurance service that monitors a network. The procedure 600 may start at step 605, and continues to step 610, where, as described in greater detail above, the service may detect anomalies in the network by applying one or more machine learning-based anomaly detectors to telemetry data from the network. In various embodiments, at least one of the one or more machine learning-based anomaly detectors comprises an unsupervised regression model. For example, such anomalies may include, but are not limited to, network throughput anomalies and/or wireless anomalies such as association, authentication, mobility, or dynamic host configuration protocol anomalies for a particular wireless service set identifier (SSID) in the network.

At step 615, as detailed above, the network assurance service may receive ranking feedback from a plurality of anomaly rankers regarding relevancy of the detected anomalies. Such feedback may be provided by the rankers on a rating scale (e.g., '1' if relevant, '-1' if not, on a sliding scale from 0-1, etc.) and may, in some cases, also include a text-based explanation for a given ranking. Such text-based feedback can be analyzed by the service to form a sentiment time series over time from the provided feedback.

At step 620, the network assurance service may calculate a rescaling factor and quantile parameter by applying an objective function to the ranking feedback, as described in greater detail above. In particular, the service may do so, in order to optimize the rescaling factor and quantile parameter of the one or more anomaly detectors that detected the anomalies. In some embodiments, the service may do so by forming groups of the parameters and attempting to search for the optimal parameter values (e.g., by calculating the velocities and objective values for the parameters, etc.).

At step 625, as detailed above, the network assurance service may adjust the rescaling factor and quantile parameter of the one or more anomaly detectors using the calculated rescaling factor and quantile parameter. In doing so, feedback from any number of anomaly rankers can be used to control whether the anomaly detector of the service views a given network behavior as anomalous and, thus, requiring the raising of an anomaly detection or issue alert. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the dynamic adjusting of anomaly detector parameters in a network assurance service, based on feedback from any number of anomaly rankers. Thus, over time, the service may learn to avoid reporting anomalies that are not relevant to the rankers. In other words, the techniques herein can be used to increase the true positive rate for the reported anomalies and, likewise, decrease the false positive rate, so that a user of the system can focus on the anomalies that are of greater relevance.

While there have been shown and described illustrative embodiments that provide for dynamically adjusting prediction ranges in a network assurance system, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   detecting, by a network assurance service that monitors a network, anomalies in the network by applying one or more machine learning-based anomaly detectors to telemetry data from the network;
   receiving, at the network assurance service, ranking feedback from a plurality of anomaly rankers regarding relevancy of the detected anomalies;
   calculating, by the network assurance service, a rescaling factor and quantile parameter by applying an objective function to the ranking feedback, in order to optimize a rescaling factor and quantile parameter of the one or more anomaly detectors; and adjusting, by the network assurance service, the rescaling factor and quantile parameter of the one or more anomaly detectors using the calculated rescaling factor and quantile parameter,
wherein calculating the rescaling factor and quantile parameter by applying an objective function to the ranking feedback comprises:
iteratively calculating, for each of the detected anomalies and based on corresponding ranking feedback, a position, a velocity, and an objective value of the rescaling factor and the quantile parameter; and
selecting a particular rescaling factor and quantile parameter when the objective value iteratively calculated for each of the detected anomalies converges or a maximum number of iterations is reached.

2. The method as in claim 1, wherein at least one of the one or more machine learning-based anomaly detectors comprises an unsupervised regression model.

3. The method as in claim 1, further comprising:
resetting, by the network assurance service, the rescaling factor and quantile parameter of the one or more anomaly detectors to default values, to desensitize the one or more anomaly detectors.

4. The method as in claim 3, wherein the network assurance service resets the rescaling factor and quantile parameter at a periodic time or in response to receiving a reset request from a user interface.

5. The method as in claim 1, wherein calculating the rescaling factor and quantile parameter by applying an objective function to the ranking feedback comprises:
applying a grid search on the rescaling factor to minimize a number of false positives from the one or more anomaly detectors.

6. The method as in claim 1, further comprising:
forming, by the network assurance service, a sentiment time series for each of the anomaly rankers by performing text analysis on text-based reasons provided by the anomaly rankers in the ranking feedback.

7. The method as in claim 6, wherein performing the text analysis comprises performing natural language processing (NLP) on the text-based reasons or applying a bidirectional long short-term memory to the text-based reasons, and wherein the method further comprises:
using, by the network assurance service, the sentiment time series to assess adjustments made by the network assurance service to the rescaling factor and quantile parameter of the one or more anomaly detectors.

8. An apparatus, comprising:
one or more network interfaces to communicate with a network;
a processor coupled to the network interfaces and configured to execute one or more processes; and
a memory configured to store a process executable by the processor, the process when executed configured to:
detect anomalies in the network by applying one or more machine learning-based anomaly detectors to telemetry data from the network;
receive ranking feedback from a plurality of anomaly rankers regarding relevancy of the detected anomalies;
calculate a rescaling factor and quantile parameter by applying an objective function to the ranking feedback, in order to optimize a rescaling factor and quantile parameter of the one or more anomaly detectors; and
adjust the rescaling factor and quantile parameter of the one or more anomaly detectors using the calculated rescaling factor and quantile parameter,
wherein the apparatus calculates the rescaling factor and quantile parameter by applying an objective function to the ranking feedback by:
iteratively calculating, for each of the detected anomalies and based on corresponding ranking feedback, a position, a velocity, and an objective value of the rescaling factor and the quantile parameter; and
selecting a particular rescaling factor and quantile parameter when the objective value iteratively calculated for each of the detected anomalies converges or a maximum number of iterations is reached.

9. The apparatus as in claim 8, wherein at least one of the one or more machine learning-based anomaly detectors comprises an unsupervised regression model.

10. The apparatus as in claim 8, wherein the process when executed is further configured to:
reset the rescaling factor and quantile parameter of the one or more anomaly detectors to default values, to desensitize the one or more anomaly detectors.

11. The apparatus as in claim 10, wherein the apparatus resets the rescaling factor and quantile parameter at a periodic time or in response to receiving a reset request from a user interface.

12. The apparatus as in claim 8, wherein the apparatus calculates the rescaling factor and quantile parameter by applying an objective function to the ranking feedback by:
applying a grid search on the rescaling factor to minimize a number of false positives from the one or more anomaly detectors.

13. The apparatus as in claim 8, wherein the process when executed is further configured to:
form a sentiment time series for each of the anomaly rankers by performing text analysis on text-based reasons provided by the anomaly rankers in the ranking feedback.

14. The apparatus as in claim 13, wherein the apparatus performs the text analysis by performing natural language processing (NLP) on the text-based reasons or by applying a bidirectional long short-term memory to the text-based reasons, and wherein the process when executed is further configured to:
use the sentiment time series to assess adjustments made by the apparatus to the rescaling factor and quantile parameter of the one or more anomaly detectors.

15. The apparatus as in claim 8, wherein the anomalies in the network comprise at least one of: an association, authentication, mobility, or dynamic host configuration protocol for a particular wireless service set identifier (SSID) in the network.

16. A tangible, non-transitory, computer-readable medium storing program instructions that cause a network assurance service that monitors a network to execute a process comprising:
detecting, by the network assurance service, anomalies in the network by applying one or more machine learning-based anomaly detectors to telemetry data from the network;
receiving, at the network assurance service, ranking feedback from a plurality of anomaly rankers regarding relevancy of the detected anomalies;
calculating, by the network assurance service, a rescaling factor and quantile parameter by applying an objective function to the ranking feedback, in order to optimize a rescaling factor and quantile parameter of the one or more anomaly detectors; and adjusting, by the network assurance service, the rescaling factor and quantile parameter of the one or more anomaly detectors using the calculated rescaling factor and quantile parameter, wherein calculating the rescaling factor and quantile parameter by applying an objective function to the ranking feedback comprises:

iteratively calculating, for each of the detected anomalies and based on corresponding ranking feedback, a position, a velocity, and an objective value of the rescaling factor and the quantile parameter; and selecting a particular rescaling factor and quantile parameter when the objective value iteratively calculated for each of the detected anomalies converges or a maximum number of iterations is reached.

\* \* \* \* \*

UNITED STATES PATENT AND TRADEMARK OFFICE
CERTIFICATE OF CORRECTION

PATENT NO. : 10,965,562 B2
APPLICATION NO. : 15/972306
DATED : March 30, 2021
INVENTOR(S) : Grégory Mermoud et al.

Page 1 of 1

It is certified that error appears in the above-identified patent and that said Letters Patent is hereby corrected as shown below:

In the Specification

Column 14, Lines 5-10, please replace Equation 4 as follows:

$$ar\,gmin_r = -\sum_{i=0}^{L} \alpha_i \cdot y_i \cdot y'_i + \lambda \cdot (r - r_{current})^2 \qquad \text{(Equation 4)}$$

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*